United States Patent
Stenger

(10) Patent No.: US 9,834,478 B2
(45) Date of Patent: Dec. 5, 2017

(54) STABILIZED SOLIDIFICATION AND SETTING ACCELERATOR FOR HYDRAULIC BINDERS

(71) Applicant: SIKA TECHNOLOGY AG, Baar (CH)

(72) Inventor: Christian Stenger, Worb (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/311,088

(22) PCT Filed: May 12, 2015

(86) PCT No.: PCT/EP2015/060419
§ 371 (c)(1),
(2) Date: Nov. 14, 2016

(87) PCT Pub. No.: WO2015/173213
PCT Pub. Date: Nov. 19, 2015

(65) Prior Publication Data
US 2017/0088464 A1    Mar. 30, 2017

(30) Foreign Application Priority Data
May 14, 2014  (EP) .................................... 14168358

(51) Int. Cl.
| C04B 22/14 | (2006.01) |
| C04B 22/06 | (2006.01) |
| C04B 28/04 | (2006.01) |
| C04B 40/00 | (2006.01) |
| C04B 103/14 | (2006.01) |
| C04B 111/00 | (2006.01) |

(52) U.S. Cl.
CPC ............ C04B 22/148 (2013.01); C04B 22/06 (2013.01); C04B 22/066 (2013.01); C04B 28/04 (2013.01); C04B 40/0039 (2013.01); C04B 2103/14 (2013.01); C04B 2111/00146 (2013.01)

(58) Field of Classification Search
None
See application file for complete search history.

(56) References Cited

U.S. PATENT DOCUMENTS

| 6,302,954 B1 | 10/2001 | Lunkenheimer et al. |
| 2006/0137576 A1* | 6/2006 | Angelskaar ......... C04B 40/0039 106/819 |
| 2007/0062417 A1* | 3/2007 | Angelskaar ......... C04B 40/0039 106/819 |
| 2007/0144405 A1* | 6/2007 | Weibel .................. C04B 24/123 106/724 |

FOREIGN PATENT DOCUMENTS

| CN | 102992677 A * | 3/2013 |
| DE | 102004016127 B3 | 8/2005 |
| EP | 0076927 B1 | 7/1985 |
| EP | 0946451 B1 | 9/2000 |
| EP | 0946451 B2 | 10/2005 |
| EP | 2261188 A1 | 12/2010 |
| FR | 2786175 A1 * | 5/2000 |
| WO | 01/42165 A2 | 6/2001 |
| WO | 2006/010407 A1 | 2/2006 |
| WO | 2006/074739 A1 | 7/2006 |

OTHER PUBLICATIONS

Aug. 5, 2015 International Search Report issued in International Patent Application No. PCT/EP2015/060419.
Nov. 24, 2016 International Preliminary Report on Patentability issued in International Patent Application No. PCT/EP2015/060419.

* cited by examiner

*Primary Examiner* — Anthony J Green
(74) *Attorney, Agent, or Firm* — Oliff PLC

(57) ABSTRACT

A solidification and setting accelerator for hydraulic binders, in particular for shotcrete/gunite or sprayed mortar, comprises sulfate, aluminum and at least two chemically distinct organic acids, each of which contains at least one hydroxy group in addition to at least one acid group, the combined maximum content of the at least two organic acids being 1 wt % in relation to the total weight of the accelerator.

14 Claims, No Drawings

STABILIZED SOLIDIFICATION AND SETTING ACCELERATOR FOR HYDRAULIC BINDERS

TECHNICAL FIELD

The invention relates to a solidification and hardening accelerator for hydraulic binders, to a method for accelerating the solidification and hardening of hydraulic binders, and to the use of the solidification and hardening accelerator in hydraulic binders, more particularly in sprayed concrete or sprayed mortar. The invention further pertains to a binder-comprising mixture comprising the solidification and hardening accelerator, and also to a cured shaped article produced therefrom.

PRIOR ART

There are numerous known substances which accelerate the solidification and hardening of concrete. Commonplace, for example, are substances giving a strongly alkaline reaction, such as alkali metal hydroxides, alkali metal carbonates, alkali metal silicates, alkali metal aluminates, and alkaline earth metal chlorides. In the case of the substances giving a strongly alkaline reaction, however, unwanted harm to the user, such as burns, may occur, and they reduce the ultimate strength and the long-term adhesiveness of the concrete.

Known from EP 0 076 927 B1 are alkali metal-free solidification accelerators for hydraulic binders which are said to avoid these disadvantages. For the acceleration of the solidification and hardening of a hydraulic binder, such as cement, lime, hydraulic lime, and gypsum, and also concrete and mortar produced therefrom, the mixture which comprises the stated binder is admixed with from 0.5 to 10 wt %, based on the weight of this binder, of an alkali metal-free solidification and hardening accelerator, this accelerator comprising aluminum hydroxide. As a result of the accelerated solidification and hardening, such mortars and concretes are especially suitable as sprayed mortar and sprayed concrete.

Known from EP 0 946 451 B1 are solidification and hardening accelerators in dissolved form for hydraulic binders, which can be mixed more easily with the concrete when the concrete is sprayed. Constituents of a solidification and hardening accelerator of this kind include aluminum hydroxide, aluminum salts, and organic carboxylic acids.

Known from WO 01/42165 is an admixture for accelerating sprayed concrete, the admixture comprising aluminum sulfate, aluminum hydroxide, and, optionally, a stabilizer selected from hydroxycarboxylic acids, phosphoric acids, and nonalkaline salts of phosphoric acid.

Such known accelerators customarily comprise a relatively high amount of organic carboxylic acids, which in particular makes production more expensive. Other disadvantages of such solidification and hardening accelerators, moreover, lie in a relatively low early strength within the first hours, and the often inadequate storage stability.

Presentation of the Invention

The invention is based on the object, for a solidification and hardening accelerator for hydraulic binders of the type specified at the outset, of achieving an extremely favorable accelerator with maximum strength in the first minutes and hours in conjunction with maximum duration of stability of the accelerator.

In accordance with the invention this is achieved through the features of the first claim.

Among the advantages considered to be possessed by the invention are that the accelerators of the invention produce a high stability, i.e., storage stability, of the accelerator solution, and that high strengths are achieved in the first minutes and hours. Moreover, the accelerator of the invention is more favorable than conventional accelerators, since only a small fraction of acids is required.

Further advantageous embodiments of the invention are apparent from the description and the dependent claims.

An Embodiment of the Invention

Solidification and curing accelerators of the invention for hydraulic binders, more particularly for sprayed concrete or sprayed mortar, comprise sulfate, aluminum, and at least two chemically different organic acids, each having at least one hydroxyl group as well as at least one acid group, the combined maximum fraction of the at least two organic acids being 1 wt %, based on the total weight of the accelerator.

The accelerator is more particularly a water-based accelerator. The accelerator is present preferably in the form of an aqueous suspension or aqueous solution.

The accelerator of the invention is preferably alkali metal-free and/or chloride-free. An alkali metal-free and/or chloride-free accelerator is understood in construction chemistry to refer customarily to an accelerator which has less than 1 wt % of alkali metal or chloride ions, based on the total weight of the accelerator.

In principle, in addition to the at least two chemically different organic acids each having at least one hydroxyl group as well as at least one acid group, there may also be one or more other acids. There is in principle no limit on the weight fraction of these other acids.

A fraction of the other acid(s), however, is advantageously less than 10 wt %, more particularly less than 6 wt %, more particularly less than 4 wt %. With further preference the fraction of the other acid(s) is preferably less than 0.2 wt %, very preferably less than 0.1 wt % or 0.01 wt %, based on the total weight of the accelerator.

One particularly preferred accelerator of the invention is free from other acids which do not have at least one hydroxyl group as well as at least one acid group.

A fraction of alkanoic acids, more particularly formic acid, is advantageously less than 6 wt %, more particularly less than 4 wt %.

With further preference a fraction of alkanoic acids, more particularly formic acid, is lower than 0.4 wt %, preferably lower than 0.2 wt %, very preferably lower than 0.1 wt % or 0.01 wt %, based on the total weight of the accelerator.

If present, a fraction of alkanoic acids, more particularly formic acid, is more particularly 0.01-4 wt %, preferably 0.05-2 wt %, in particular 0.1-1 wt % or 0.1-0.5 wt %, based on the total weight of the accelerator.

One particularly preferred accelerator of the invention is free from alkanoic acids, more particularly formic acid.

In particular the accelerator is free from phosphoric acid, hydrochloric acid, nitric acid, and/or salts of the stated acids. This means in particular that a fraction of these acids and/or salts is less than 0.1 wt %, more particularly less than 0.01 wt %, based on the total weight of the accelerator.

The term "organic acid" in the context of this patent application should be interpreted broadly, and encompasses essentially all organic compounds which possess at least one acidic functional group or an acid group and which when added to pure water are capable of reducing its pH.

Acid groups presently also comprise, in particular, acidic hydroxyl groups and enols, as well as carboxyl groups.

Presently, in particular, organic acids or acid groups each have a $pK_a \leq 6$, preferably in the range of 2-5, especially preferably 3.0-4.5. If an organic acid has a plurality of acid groups, the acid group with the lowest $pK_a$ is decisive. The $pK_a$ here is the negative base-ten logarithm of the acid constant $K_a$, and is determined at a temperature of 25° C. under standard conditions in water.

The expression "chemically differentiatable" in the present context stands in particular for compounds which have different empirical formulae. Acid groups in this context are always considered in the neutral state (protonated group).

A fraction of the at least two organic acids together is more particularly 0.001 to 1 wt %, preferably 0.1-0.9 wt % or 0.4-0.8 wt %, based on the total weight of the accelerator.

In particular at least one of the two organic acids is an organic acid which as acid group has at least one, more particularly two, preferably three carboxyl group(s).

Very preferably at least one of the two organic acids is a hydroxycarboxylic acid, more particularly an α-hydroxycarboxylic acid, preferably citric acid.

An organic acid having at least one carboxyl group as acid group or a hydroxycarboxylic acid, more particularly an α-hydroxycarboxylic acid, preferably citric acid, advantageously possesses a weight fraction of 0.05-0.8 wt %, more particularly 0.3-0.7 wt %, based on the total weight of the accelerator.

According to a further advantageous embodiment, at least one of the two organic acids has as acid group an enol group, more particularly an enediol group (compounds which carry a hydroxyl group on each of the two carbon atoms of a C=C double bond). More preferably at least one of the two organic acids contains a reductone group (compounds which additionally have a carbonyl group directly on the adjacent carbon atom of an enediol group).

More preferably at least one of the two organic acids is ascorbic acid.

An organic acid having an enol group, an enediol group or a reductone group, more particularly ascorbic acid, preferably has a weight fraction of 0.05-0.8 wt %, more particularly 0.1-0.3 wt %, based on the total weight of the accelerator.

It is particularly advantageous if a first of the two organic acids is a hydroxycarboxylic acid and a second of the two organic acids contains as acid group an enol group, an enediol group or a reductone group.

A weight ratio of the at least two organic acids is preferably in the range of 5:1-1:5, more particularly 3:1-1:1.

In particular a first of the two organic acids is citric acid and a second of the two organic acids is ascorbic acid. These two organic acids are preferably used with the weight fractions stated above.

According to a further advantageous embodiment, a molar ratio of aluminum to sulfate in the accelerator is 0.7-1.5, more particularly 0.8-1.0.

In particular the accelerator, based in each case on the total weight of the accelerator, contains 10 to 35 wt %, more particularly 15 to 29 wt %, preferably 15-27 wt %, more preferably 24.5 to 27 wt % of sulfate.

A fraction of aluminum, based in each case on the total weight of the accelerator, is in particular 3.2 to 9.5 wt %, advantageously 3.2-9.0 wt %, preferably 4 to 6.5 wt %.

The accelerator, based in each case on the total weight of the accelerator, contains preferably 0.001 to 1 wt %, more particularly 0.01 to 1 wt %, especially 0.1-0.95 wt %, in particular 0.6-0.95 or 0.6-0.9 wt %, of the at least two organic acids.

One particularly advantageous accelerator comprises 10 to 35 wt % of sulfate, 3.2 to 9.5 wt % of aluminum, and 0.001 to 1 wt % of the at least two organic acids, based in each case on the total weight of the accelerator.

Another advantageous accelerator comprises 10 to 27 wt % of sulfate, 3.2 to 9.0 wt % of aluminum, and 0.001 to 1 wt % of the at least two organic acids, based in each case on the total weight of the accelerator.

Even more preferred is an accelerator comprising 15 to 29 wt %, preferably 15-27 wt %, more preferably 24.5 to 27 wt % of sulfate, 4 to 6.5 wt % of aluminum, and 0.01 to 1 wt % of the at least two organic acids, based in each case on the total weight of the accelerator.

An accelerator of the invention advantageously comprises aluminum sulfate, aluminum hydroxysulfate, sulfuric acid, aluminum hydroxide, and/or aluminum hydroxide carbonate.

The sulfate of the accelerator originates in particular from aluminum sulfate, aluminum hydroxysulfate and/or sulfuric acid. In other words, the accelerator contains in particular at least one of the stated substances as sulfate source.

The aluminum of the accelerator originates advantageously from aluminum sulfate, aluminum hydroxysulfate, aluminum hydroxide, and/or aluminum hydroxide carbonate. Expressed alternatively, the accelerator contains in particular at least one of the stated substances as aluminum source.

An accelerator of the invention contains, in particular, aluminum sulfate and/or sulfuric acid, and also aluminum hydroxide and at least two organic acids. As aluminum hydroxide, amorphous aluminum hydroxide in particular is used.

The aluminum sulfate which can be used for production may comprise a varying amount of water of crystallization. The aluminum sulfate typically used is aluminum sulfate tetradecahydrate $(Al_2(SO_4)_3 \cdot 14\ H_2O)$. It is customarily also referred to as 17% aluminum sulfate, since it contains 17% of $Al_2O_3$. The quantity figures concerning aluminum sulfate that are stated in this present specification are based on $Al_2(SO_4)_3 \cdot 14\ H_2O$. If the aluminum sulfate contains different amounts of water of crystallization, the amounts of aluminum sulfate required for the present invention are easy to calculate. For instance, 40 to 60 wt % of $Al_2(SO_4)_3 \cdot 14\ H_2O$ would correspond to an amount of 23 to 35 wt % of $Al_2(SO_4)_3$ free from water of crystallization.

The aluminum sulfate may also be generated by reaction of aluminum hydroxide with sulfuric acid during the production of the accelerator, in which case sulfate ions are formed accordingly in the aqueous solution. Generally speaking, aluminum sulfate may be generated by reaction of a basic aluminum compound with sulfuric acid.

The aluminum hydroxide may be used in amorphous or crystalline form. Amorphous aluminum hydroxide is used advantageously. The aluminum hydroxide may also be used in the form of aluminum hydroxide carbonate, aluminum hydroxysulfate or the like.

The accelerator contains preferably 30 to 70 wt % of aluminum sulfate $(Al_2(SO_4)_3 \cdot 14\ H_2O)$, 0.1 to 20 wt % of aluminum hydroxide and/or 0.001 to 1 wt % of the at least two organic acids, based on the total weight of the accelerator.

With further preference the accelerator contains 35 to 65 wt %, more particularly 35 to 45 wt %, especially 35-40 wt %, of aluminum sulfate $(Al_2(SO_4)_3 \cdot 14\ H_2O)$, 9 to 18 wt %, especially 13-18 wt %, of aluminum hydroxide and/or 0.01 to 1 wt % of the at least two organic acids, based in each case on the total weight of the accelerator.

In order to obtain accelerators with even better storage stability, the accelerator may additionally comprise magnesium hydroxide ($Mg(OH)_2$), magnesium oxide (MgO), magnesium oxyhydroxide, magnesium carbonate and/or the corresponding amount of another magnesium compound, preferably in an amount of 0.1 to 10 wt %, more particularly 0.2 to 5 wt % or 0.5 to 4 wt %, based on the total weight of the accelerator.

It may further be advantageous for the accelerator additionally to contain 0.1-10 wt % of alkanolamine, based on the total weight of the accelerator. Alkanolamine used is advantageously monoethanolamine, diethanolamine, triethanolamine and/or methyldiisopropanolamine.

Additionally it is possible to produce the accelerator of the invention using at least one further metal sulfate with a valence of two or higher, preferably in an amount of 0.1-5 wt %, based on the total weight of the accelerator. Particularly preferred as further metal sulfate is manganese(II) sulfate. Likewise suitable is iron sulfate.

Good results and stable accelerators likewise are obtained with an accelerator of the invention which further comprises silica.

The term "silica" throughout the present specification refers to a silica which as well as orthosilica includes all forms of silicon dioxide, i.e., the anhydride of orthosilicic acid, silicon dioxide proper, and colloidal, precipitated or pyrogenic silica or silica fume. The silica used in the accelerator of the invention preferably, therefore, is or comprises colloidal, precipitated, pyrogenic silica or microsilica (silica fume) or a mixture thereof.

The amount of silicon dioxide, or the solids content of the silica, based on the total weight of the accelerator, is preferably 0.1 to 40 wt %, more preferably 1 to 30 wt %, even more preferably 3 to 20 wt %, more particularly 6 to 15 wt %.

The accelerator of the invention may further comprise plasticizers, more particularly polycarboxylates, or stabilizers, e.g., bentonites, Actigel 208, kaolin or magnesium silicates, e.g., sepiolite.

The accelerator of the invention may of course comprise further suitable admixtures known to the person skilled in the art. Preferably, however, it contains no further thickeners or thixotropic agents.

A fraction of water in the accelerator is, in particular, 20-60 wt %, more particularly 35-55 wt %, preferably 40-50 wt %, based on the total weight of the accelerator. This figure includes any water of crystallization from the accelerator components, such as water of crystallization from aluminum sulfate, for example.

Furthermore, the accelerator of the invention may further comprise glycerol, preferably in an amount of 0.1 to 8 wt %, more particularly 2 to 4 wt %, based on the total weight of the accelerator.

The aforementioned substances are here encountered in particular at least partly as ions in solution. Alternatively, for example, they may occur in complexed form or in undissolved form in the accelerator. This is the case in particular when the accelerator is present as a solution with in some cases finely dispersed particles, or as a suspension.

A particularly advantageous solidification and hardening accelerator of the invention comprises, for example, the following components, or consists thereof:
 (a) 15 to 35 wt % of sulfate;
 (b) 3.2 to 9.5 wt % of aluminum (or 6 to 18% of $Al_2O_3$);
 (c) 0.001 to 1 wt % of two chemically different organic acids, especially ascorbic acid and citric acid;
 (d) 0 to 10 wt % of magnesium hydroxide;
 (e) 0 to 10 wt % of alkanolamine;
 (f) 0 to 5 wt % of a further metal sulfate with a valence of two or higher;
 (g) 0 to 5 wt % of plasticizer, more particularly a polycarboxylate ether;
 (h) 0 to 35 wt % of silicon dioxide;
 (i) 0 to 8 wt % of glycerol;
 (j) water as remaining amount.

A preferred solidification and hardening accelerator of the invention contains for example (in wt %, based in each case on the total weight of the accelerator):
 (a) 35-60 wt % of aluminum sulfate ($Al_2(SO_4)_3 \cdot 14\ H_2O$);
 (b) 0.1 to 20 wt % of aluminum hydroxide ($Al(OH)_3$);
 (c) 0.001 to 1 wt % of the at least two organic acids, especially ascorbic acid and citric acid;
 (d) 0-10 wt %, more particularly 0.5-5 wt %, of magnesium hydroxide;
 (e) 0-10 wt % of alkanolamine;
 (f) 0-5 wt % of a further metal sulfate with a valence of two or higher;
 (g) 0-35 wt % of silicon dioxide;
 (h) 0-8 wt % of glycerol;
 (i) 0-5 wt % of plasticizer;
 (j) water as remaining amount.

A further aspect of the present invention relates to a method for producing a setting and hardening accelerator of the invention. In this method, the components or substances stated above are mixed in particular to form an aqueous solutions or suspension. The individual substances may be added in principle in any order. The accelerators of the invention are obtainable accordingly by such methods.

The accelerators of the invention may be prepared or be present, for example, as a solution, dispersion or in powder form; in the case of an accelerator present as a powder, it is preferably dissolved or dispersed in water before use.

If a magnesium hydroxide and/or magnesium oxide is used in the production of the accelerator, the strong reaction of the magnesium hydroxide and/or oxide with the organic acid causes a sharp rise in the temperature of an aqueous solution or dispersion, and so particularly thorough mixing is achieved. This simplifies the production operation, and less energy is required.

An additional advantage of using magnesium is the further improvement in storage stability of the accelerators that is brought about by the magnesium ions. At a level of just 0.5 wt %, especially 1 wt %, of magnesium hydroxide at the production stage, even better storage stability is achieved. The development of the compressive strength of the sprayed concrete in the first hours and days is also positively influenced, and is better than for conventionally used accelerators.

The present invention further relates to a method for accelerating the solidification and hardening of hydraulic binders and also of concrete or mortar produced therefrom, characterized in that the mixture which comprises hydraulic binders is admixed with a solidification and hardening accelerator of the invention in an amount of 0.1 to 15 wt %, more particularly of 1 to 10 wt %, very preferably 4-8 wt %, based on the weight of the hydraulic binder.

The accelerator of the invention can be used for accelerating the setting and hardening of hydraulic binders, hydraulic binders in blends with latent hydraulic binders or inert fillers, mortar or concrete. A preferred use is in sprayed mortar or sprayed concrete by the dry or wet spraying method, with the accelerator being added or metered into the dry or water-tempered binder, mortar or concrete in the conveying line, the prewetting nozzle or the spraying nozzle, directly into the mixture or into the tempering water. Preferably, an accelerator in the form of a solution or dispersion is metered in using a liquid metering apparatus, and an accelerator in powder form using a powder metering apparatus.

Examples of binders whose hardening and setting may be accelerated by the accelerator of the invention or by the method are cement such as blended cements, lime, hydraulic lime, and gypsum, each alone or in blends with latent hydraulic binders or inert fillers, and examples of mixtures which comprise these binders are mortar and concrete, more particularly sprayed mortar and sprayed concrete.

A further subject of the present invention, moreover, is a curable or cured, binder-comprising mixture which comprises the accelerator of the invention, more particularly sprayed mortar and sprayed concrete comprising the accelerator of the invention.

The effect of using the solidification and hardening accelerators of the invention is an extremely rapid setting of the corresponding binders or of the mixtures which comprise such binders, and high initial strengths and ultimate strengths are attained.

The working examples below show the person skilled in the art further modifications and advantages of the invention.

WORKING EXAMPLES

1. Production of Accelerators

Various accelerators A1-A2 (inventive) and B1-B11 (comparative tests) were produced, with the compositions described in table 1. In each case the water was introduced at room temperature (about 20° C.), the magnesium hydroxide was slurried in this water, and the acid or acids identified in table 1 (quantity figure based in each case on pure acid(s) or active substance) were added, producing an increase in the temperature of the solution. Thereafter the aluminum sulfate (17% $Al_2O_3$) and the aluminum hydroxide (amorphous) were added and dissolved at elevated temperature. The solution was then stirred until, after about an hour, the temperature had dropped to about 40° C. The accelerators thus are present in the form of clear solutions with in some cases finely dispersed particles.

TABLE 1

Accelerator compositions (all amounts in wt %)

| No. | $H_2O$ | $Al(OH)_3$ (amorphous) | $Al_2(SO_4)_3 \cdot 14\ H_2O$ | $Mg(OH)_2$ | Acid(s)/Fraction(s) |
|---|---|---|---|---|---|
| A1 | 45.70 | 15.60 | 37.00 | 1.00 | Citric acid/0.50 Ascorbic acid/0.20 |
| A2 | 45.45 | 15.60 | 37.00 | 1.00 | Citric acid/0.50 Ascorbic acid/0.20 Formic acid/0.25 |
| B1 | 45.90 | 15.60 | 37.00 | 1.00 | Citric acid/0.50 |
| B2 | 45.10 | 15.60 | 37.00 | 1.00 | Citric acid /1.30 |
| B3 | 44.75 | 15.60 | 37.00 | 1.00 | Citric acid/0.50 Ascorbic acid/1.15 |
| B4 | 44.70 | 15.60 | 37.00 | 1.00 | Citric acid /1.02 Ascorbic acid/0.68 |
| B5 | 45.95 | 15.60 | 37.00 | 1.00 | Ascorbic acid/0.20 Formic acid/0.25 |
| B6 | 45.66 | 15.60 | 37.00 | 1.00 | Ascorbic acid/0.43 Formic acid/0.31 |
| B7 | 46.20 | 15.60 | 37.00 | 1.00 | Ascorbic acid/0.20 |
| B8 | 45.65 | 15.60 | 37.00 | 1.00 | Citric acid/0.50 Formic acid/0.25 |
| B9 | 45.51 | 15.60 | 37.00 | 1.00 | Citric acid/0.61 Formic acid/0.28 |
| B10 | 46.40 | 15.60 | 37.00 | 1.00 | — |
| B11 | 44.58 | 15.60 | 37.00 | 1.00 | Phosphoric acid/1.82 |

2. Properties and Effect of the Accelerators

The accelerators were evaluated by eye for their stability. This "stability" represents the time (measured in days) during which an accelerator solution remains substantially unchanged in terms of viscosity and phase structure when viewed at room temperature (about 20° C.) in a tightly sealed container. This means that within this period there is no significant sedimentation, and the water-like flow behavior present at the start is retained. Table 2 lists the stabilities thus determined of the accelerators from table 1. Values of more than 145 days are considered very good. Values below 145 days or less than 5 months may already entail massive restrictions; from production through delivery to distribution centers, delivery to customers, and the processing of an accelerator, the time may be scarce.

The activity of the accelerator compositions (A1-A2 and B1-B11) was determined using a sprayed concrete-equivalent cement paste. The cement paste consists of 8000 g of Portland cement (hydraulic binder), 1600 g of finely ground limestone, 0.7 wt % of Sika® ViscoCrete® SC-500 (superplasticizer; available from Sika Deutschland GmbH; percentage based on the amount of the hydraulic binder) and water (w/c=0.42).

The cement pastes were subsequently applied to an ultrasound measuring cell, using a miniaturized sprayed concrete apparatus, with admixing of 6 wt % (based on the amount of the hydraulic binder) in each case of accelerator in the nozzle region. The development of the solidification and hardening process of the applied cement paste was then measured by the ultrasound measurement method as described in chapter 3 of the publication by L. Oblak et al. (L. Oblak, B. Lindlar, and D. Lootens "Kontinuierliche Messung der Festigkeitsentwicklung von Spritzbeton" [8 Continuous measurement of development of strength in sprayed concrete], Sprayed concrete conference 2012 Alpbach). The parameter determined in each case was the development in the shear modulus G over time. During the ultrasound measurements, the temperature was measured in each case directly on the applied cement paste and on the ultrasound spread section, and the temperature dependence of the ultrasound measurement results was included in the considerations. As set out in the publication referred to above, the ultrasound measurement method correlates very well with common measurement methods such as, for example, Proctor meter, Hilti fired bolt, and compressive strength. The results of the ultrasound measurements are directly comparable, accordingly, with results determined by these methods.

Table 2 shows the results of the spraying tests. Indicated in each case are the shear moduli G at times 2 minutes, 6 minutes, and 200 minutes after application. These are particularly relevant times for sprayed concrete applications in particular.

TABLE 2

Stabilities of the accelerators and results of the spraying tests

| Accelerator | Stability [Days] | Shear modulus G after x minutes [MPa] | | |
|---|---|---|---|---|
| | | x = 2 min | x = 6 min | x = 200 min |
| A1 | 155 | 1.9 | 32 | 230 |
| A2 | 159 | 0.9 | 20 | 178 |
| B1 | 140 | 1.2 | 20 | 177 |
| B2 | 55 | 0.5 | 18 | 245 |
| B3 | 179 | 1.6 | 21 | 128 |
| B4 | 180 | 0.6 | 14 | 124 |
| B5 | 123 | — | — | — |
| B6 | 119 | — | — | — |
| B7 | 107 | — | — | — |
| B8 | 80 | — | — | — |
| B9 | 77 | — | — | — |
| B10 | 54 | 3.4 | 33 | 887 |
| B11 | 124 | 2.3 | 31 | 544 |

From table 2 it is apparent that the inventive accelerators A1 and A2 exhibit very good stabilities of 155 and 159 days respectively. Similarly, at all of the times investigated, after 2 minutes, 6 minutes, and 200 minutes, high values are achieved for the shear modulus G and respectively for the strengths which correlate with it. This is so in particular for accelerator A1, which in comparison to accelerator A2 contains no formic acid.

While it is possible to obtain even higher values with the shear modules G using accelerators without acid (B10) or accelerators containing phosphoric acid (B11), such accelerators nevertheless score poorly for stability.

With the accelerators B3 and B4, which possess a non-inventive fraction of ascorbic acid (B3; 1.15 wt %) and citric acid (B4; 1.02 wt %), respectively, very high stability values are achieved. In comparison with accelerator A1, however, for example, these accelerators are clearly inferior in terms of shear modulus G and/or strength development.

Ascorbic acid alone (B7) or citric acid alone (B2; 0.5 % and B2, 1.3 wt %) on their own produce clearly poorer to very poor stability values. The accelerator with 0.5 wt % of citric acid alone (B1), moreover, scores much more poorly, in terms of the development of the shear modulus at all times, than the comparable accelerator with citric acid and ascorbic acid (A1). When using 1.3 wt % of citric acid alone (B2), a higher shear modulus G is achieved than with accelerator A1 at later times (200 min), but at earlier times particularly relevant for sprayed concrete applications (2 min and 6 min) the corresponding values are very much lower.

The embodiments described above should, however, be understood merely as illustrative examples, which may be modified as desired within the scope of the invention.

The invention claimed is:

1. A solidification and hardening accelerator for hydraulic binders, comprising sulfate, aluminum, and at least two chemically different organic acids, each having at least one hydroxyl group as well as at least one acid group, the combined maximum fraction of the at least two organic acids being 0.95 wt % based on the total weight of the accelerator,
wherein at least one of the two organic acids is a hydroxycarboxylic acid.

2. The accelerator as claimed in claim 1, wherein the hydroxycarboxylic acid has a weight fraction of 0.05-0.8 wt % based on the total weight of the accelerator.

3. The accelerator as claimed in claim 1, wherein at least one of the two organic acids contains as acid group an enol group, an enediol group or a reductone group.

4. The accelerator as claimed in claim 3, wherein the organic acid having an enol group, an enediol group or a reductone group has a weight fraction of 0.05-0.8 wt % based on the total weight of the accelerator.

5. The accelerator as claimed in claim 1, wherein a first of the two organic acids is a hydroxycarboxylic acid and in that a second of the two organic acids contains as acid group an enol group, an enediol group or a reductone group.

6. The accelerator as claimed in claim 1, wherein a first of the two organic acids is citric acid and a second of the two organic acids is ascorbic acid.

7. The accelerator as claimed in claim 1, wherein a weight ratio of the at least two different organic acids is in the range of 5:1-1:5.

8. The accelerator as claimed in claim 1, wherein it comprises 17 to 35 wt % of sulfate, 3.2 to 9.5 wt % of aluminum, and 0.001 to 1 wt % of the at least two organic acids, based on the total weight of the accelerator.

9. The accelerator as claimed in claim 1, wherein 0.1 to 10 wt % of magnesium hydroxide, magnesium oxide, magnesium oxyhydroxide, magnesium carbonate and/or the corresponding amount of another magnesium compound, based on the total weight of the accelerator, are present.

10. The accelerator as claimed in claim 1, wherein a fraction of further acids is less than 0.1 wt % based on the total weight of the accelerator.

11. A method for accelerating the solidification and hardening of hydraulic binders, concrete comprising hydraulic binders, or mortar comprising hydraulic binders, wherein a mixture which comprises hydraulic binders is admixed with a solidification and hardening accelerator as claimed in claim 1 in an amount of 0.1 to 15 wt %, based on the weight of the hydraulic binder.

12. A method of making a hydraulic binder-comprising mixture, comprising adding the solidification and hardening accelerator as claimed in claim 1 to a hydraulic binder.

13. A binder-comprising mixture comprising a hydraulic binder and the accelerator as claimed in claim 1.

14. A cured shaped article obtained by curing a binder-comprising mixture as claimed in claim 13, tempered with water.

* * * * *